United States Patent
Stifelman et al.

(10) Patent No.: US 7,613,287 B1
(45) Date of Patent: Nov. 3, 2009

(54) METHOD AND APPARATUS FOR PROVIDING RINGBACK TONES

(75) Inventors: Lisa J. Stifelman, Palo Alto, CA (US); Gary Clayton, Daly City, CA (US); Rao S. Surapaneni, San Jose, CA (US); Madhusudan Chinthakunta, Saratoga, CA (US)

(73) Assignee: TellMe Networks, Mountain View, CA (US)

( * ) Notice: Subject to any disclaimer, the term of this patent is extended or adjusted under 35 U.S.C. 154(b) by 785 days.

(21) Appl. No.: 11/274,945

(22) Filed: Nov. 15, 2005

(51) Int. Cl.
*H04M 3/42* (2006.01)
(52) U.S. Cl. .............................. 379/215.01; 379/201.01
(58) Field of Classification Search ............. 379/215.01
See application file for complete search history.

(56) References Cited

U.S. PATENT DOCUMENTS

| | | | |
|---|---|---|---|
| 5,539,809 A | 7/1996 | Mayer et al. ................... 379/67 |
| 6,094,587 A | 7/2000 | Armanto et al. .............. 455/567 |
| 6,366,791 B1 | 4/2002 | Lin et al. ..................... 455/567 |
| 6,456,601 B1 | 9/2002 | Kozdon et al. ............... 370/259 |
| 6,829,332 B2 | 12/2004 | Farris et al. ............... 379/88.02 |
| 7,224,788 B1 * | 5/2007 | Rhee et al. ............. 379/207.02 |
| 2003/0002657 A1 | 1/2003 | Seelig et al. ........... 379/373.01 |
| 2003/0054867 A1 | 3/2003 | Dowlat et al. ................ 455/567 |
| 2003/0086558 A1 | 5/2003 | Seelig et al. ........... 379/373.01 |
| 2003/0128834 A1 | 7/2003 | Laine ..................... 379/374.01 |
| 2004/0120493 A1 | 6/2004 | Creamer et al. ......... 379/207.08 |
| 2004/0120506 A1 | 6/2004 | Boyd et al. ............. 379/373.02 |
| 2004/0132435 A1 | 7/2004 | No et al. ................... 455/414.1 |
| 2004/0174983 A1 | 9/2004 | Olschwang et al. ......... 379/377 |
| 2005/0096006 A1 | 5/2005 | Chen et al. ................... 455/400 |
| 2005/0105706 A1 | 5/2005 | Kokkinen .............. 379/201.01 |
| 2005/0117726 A1 | 6/2005 | DeMent et al. ......... 379/142.01 |
| 2005/0150360 A1 | 7/2005 | Tsukamoto et al. ........... 84/613 |
| 2005/0172154 A1 | 8/2005 | Short et al. .................. 713/201 |
| 2005/0185918 A1 * | 8/2005 | Lowe ........................... 386/46 |
| 2006/0182247 A1 * | 8/2006 | Batni et al. .................. 379/189 |
| 2007/0003047 A1 * | 1/2007 | Batni et al. ............. 379/215.01 |

FOREIGN PATENT DOCUMENTS

| | | | |
|---|---|---|---|
| EP | 1 394 768 A1 | | 3/2004 |
| EP | 1 558 011 A2 | | 7/2005 |
| KR | 2007045444 | * | 10/2005 |
| WO | WO 01/06735 A2 | | 1/2001 |
| WO | WO 2004/021331 A1 | | 3/2004 |
| WO | WO 2005/006724 A1 | | 1/2005 |

* cited by examiner

*Primary Examiner*—Creighton Smith
(74) *Attorney, Agent, or Firm*—Perkins Coie LLP

(57) ABSTRACT

A method of providing a ringback tone to a calling party. The method includes receiving a call directed to a subscriber from the calling party. At least one of an adaptive ringback tone and an actionable ringback tone is provided to the calling party. The adaptive ringback tone is based on state data.

55 Claims, 10 Drawing Sheets

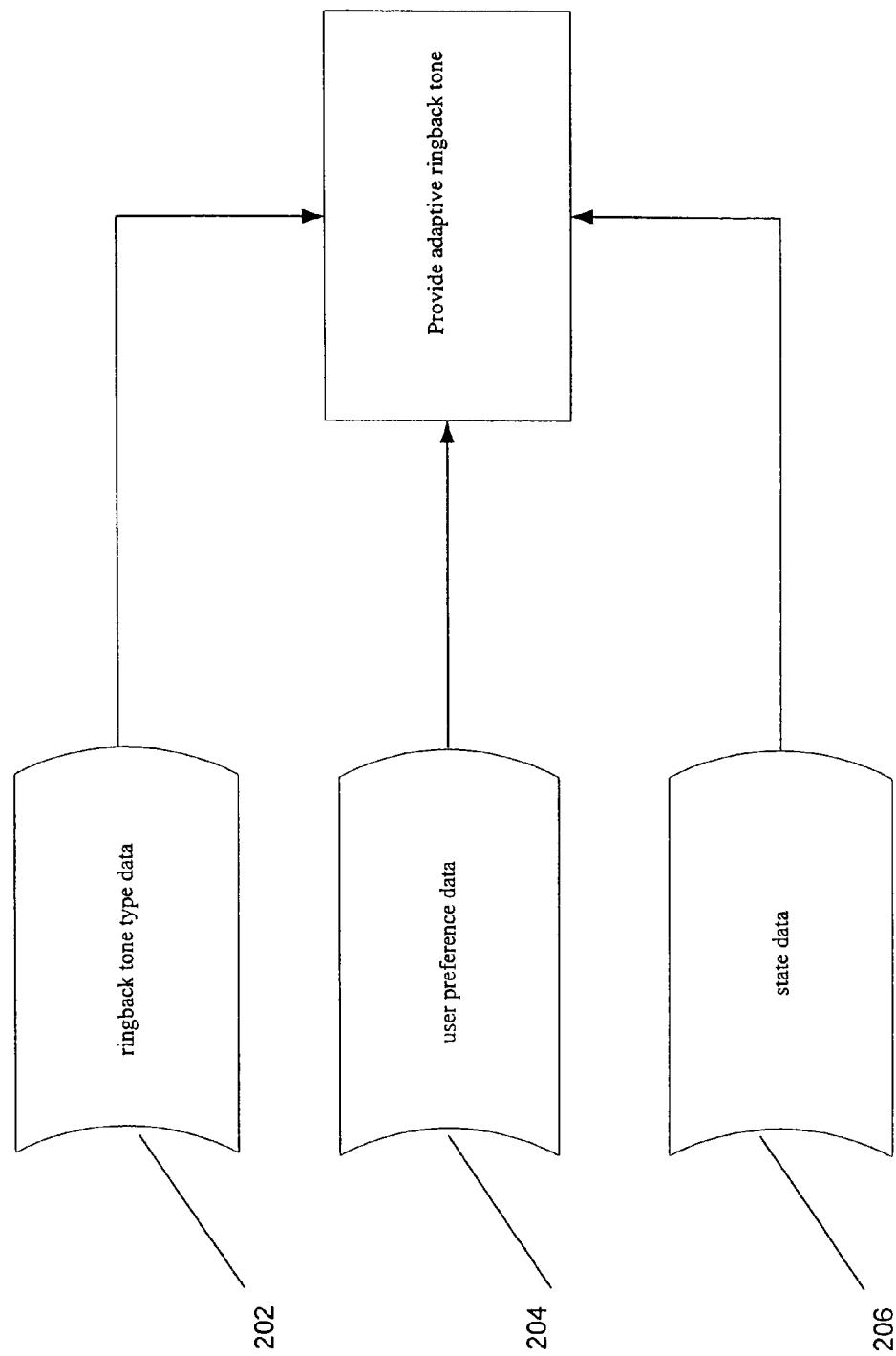

METHOD AND APPARATUS FOR PROVIDING RINGBACK TONES

TECHNICAL FIELD

This patent application relates generally to communication systems, and, more particularly, to method and apparatus for providing dynamic, progressive, adaptive and/or actionable ringback tones.

BACKGROUND ART

A calling party initiating a phone call to a destination party is typically provided with a ringback tone until the destination party answers the phone and communication between the calling party and the destination party is established. In the past, a standard ringback tone was provided, such that the same ringback tone was heard by all callers in a telephone network.

More recently, newer services allow a subscriber to customize their ringback tone. Instead of hearing a standard ringback tone, the calling party hears a ringback tone based on, for example, the identity of the calling party, time of day, or other factors. A variety of ringback tones may be provided, including musical songs and advertisements. The subscriber may also record his own ringback tone.

However, current ringback tones are still static and repeating, so the caller hears the same thing over and over with each ring. These sounds can become tedious very quickly, especially if the calling party calls multiple times over a short period of time and has to hear these tones repeatedly. The calling party is also likely to hear the same ringback tone each time he calls because configuring ringback tones can be laborious. Acquiring/downloading new ringback tones, changing them on a regular basis, and assigning them to specific callers is often inconvenient and time consuming. Current ringback tones also do not allow the calling party to perform any action while listening to the ringback tone, except to disconnect the call.

SUMMARY OF THE INVENTION

In accordance with one embodiment of the invention, a method of providing an adaptive ringback tone to a calling party is disclosed. The method includes receiving a call to a subscriber from the calling party. An adaptive ringback tone is provided to the calling party based on state data.

In related embodiments of the invention, the call may include ANI information having a phone number of the calling party. A reverse lookup may be performed in a database using the phone number of the calling party so as to locate the state data of the calling party. The database may be a personal address book related to the subscriber.

In further related embodiments of the invention, the adaptive ringback tone may be based on at least one of a progressive ringback tone, a message ringback tone, a list-based ringback-tone, and a dynamic ringback tone. A database may be maintained to store the state data.

In still further related embodiments of the invention, a playback position may be stored in the state data, the playback position indicative of when the calling party stopped listening to the adaptive ringback tone in a previous call. The adaptive ringback tone may be divided into a plurality of segments. The playback position may include a segment position indicative of the last segment heard by the calling party. Providing the adaptive ringback tone may include playing the adaptive ringback tone as a function of the playback position.

In yet further related embodiments of the invention, providing the adaptive ringback tone may include maintaining a list of ringback tones, selecting one of the ringback tones based on the state data, and providing the selected ringback tone. The state data may include a history of ringback tones provided to the calling party, wherein selecting the ringback tone is a function of the history. The list of ringback tones may include one or more categories of ringback tones, such as a movie theme, a musical theme, and/or a sport. The adaptive ringback tone may be associated with a file stored in a ringback tone database, the file including data that is dynamic between one or more calls from the subscriber.

In accordance with another embodiment of the invention, a system for providing an adaptive ringback tone to a calling party is disclosed. The system includes a call module for receiving a call to a subscriber from the calling party. A ringback tone module provides an adaptive ringback tone to the calling party based on state data.

In related embodiments of the invention, the system may includes a reverse lookup module for performing a reverse lookup in a database using caller id information received in the call, so as to locate the state data associated with the calling party. The database may be a personal address book.

In further related embodiments of the invention, the adaptive ringback tone may be based on at least one of a progressive ringback tone, a message ringback tone, a list-based ringback tone, and a dynamic ringback tone. A database may be maintained to store the state data.

In still further related embodiments of the invention, the state data may include a playback position, the playback position indicative of when the calling party stopped listening to the adaptive ringback tone in a previous call. The ringback tone module may provide the adaptive ringback tone starting as a function of the playback position. The adaptive ringback tone may be divided into a plurality of segments. The playback position may include a segment position indicative of the last segment heard by the calling party. The ringback tone module may provide the adaptive ringback tone as a function of the segment position.

In yet further related embodiments of the invention, the ringback tone module may include a list of ringback tones. A ringback tone selection module may select, based on the state data, one of the ringback tones in the list to be provided to the calling party. The state data may include a history of ring back tones provided to the calling party, the selection module selecting the ringback tone as a function of the history. The list of ringback tones may include one or more categories of ringback tones, such as a movie theme, a musical theme, and/or a sport. The adaptive ringback tone may be associated with a file stored in a ringback tone database, the file including data that is dynamic between one or more calls from the subscriber.

In accordance with another embodiment of the invention, a method of providing an actionable ringback tone to a calling party is provided. The method includes receiving a call directed towards a subscriber from the calling party. An actionable ringback tone is provided to the calling party. A response to the actionable ringback tone from the calling party is received. An action is performed based on the response.

In related embodiments of the invention, the actionable ringback tone provided to the calling party is interrupted upon the subscriber answering the call. Interrupting the actionable ringback tone ma include continuing to play the ringback tone until a predetermined stopping point is reached. The actionable ringback tone may include a voice prompt. The actionable ringback tone may include a question, an advertisement, a survey request, a transaction, and/or an inquiry as to whether the calling party wishes to purchase the ringback tone. Performing the action may include logging the response in a database. The calling party may provide the response by providing a voice response and/or pressing one or more DTMF keys. The actionable ringback tone may include inquiring as to whether the calling party wishes to purchase the ringback tone.

In accordance with another embodiment of the invention, a system for providing an actionable ringback tone to a calling party is provided. The system includes a call module for receiving a call directed towards a subscriber from the calling party. A ringback tone module provides the actionable ringback tone to the calling party. A response module receives a response to the actionable ringback tone from the calling party. An action module performs an action based on the response.

In accordance with related embodiments of the invention, the ringback tone module may interrupt the actionable ringback tone provided to the calling party upon the subscriber answering the call. The ringback tone module may interrupt the actionable ringback tone by continuing to play the ringback tone until a predetermined stopping point is reached. The actionable ringback tone may includes a voice prompt. The actionable ringback tone may include a question, an advertisement, a survey request, a transaction, and/or an inquiry as to whether the calling party wishes to purchase the ringback tone. The action module may include a database for logging the response. The response module may include a speech enabled media module for receiving a voice response from the calling party. The response module may monitor the pressing of one or more DTMF keys.

In accordance with another embodiment of the invention, a method of providing a progressive ringback tone to a calling party is provided. The method includes defining a plurality of data segments. A call to a subscriber from the calling party is received. One of the plurality of segments is selected based on state data associated with the call. The selected segment is provided to the calling party.

In related embodiments of the invention, each segment may include audio data, video data, and/or text data. The state data may include a playback position indicative of the last segment heard by the calling party. The state data may include a history of the segments already heard by the calling party in the call. The steps of selecting and providing may be provided until the subscriber answers the call. Each segment providing to the calling party may be separated by a sound separator. The sound separator may be a period of silence.

In accordance with another embodiment of the invention, a system for providing a progressive ringback tone to a calling party is provided. The system includes a plurality of data segments representing a ringback tone. A call receive module receives a call to a subscriber from the calling party. A segment selector selects one of the segments based on state data associated with the call. A call provide module provides the selected segment to the calling party.

In accordance with related embodiments of the invention, each segment may include audio data, video data, and/or text data. The state data may include a playback position indicative of the last segment heard by the calling party. The state data may include a history of the segments already heard by the calling party in the call. The call receive module and the segment selector may repeatedly select and provide one of the segments until the subscriber answers the call. Each segment provided to the calling party may be separated by a sound separator. The sound separator may be a period of silence.

In accordance with another embodiment of the invention, a method of providing a dynamic ringback tone to a calling party is provided. The method includes receiving a text feed. Speech segments based on the text feed are concatenating to form a ringback tone. A call to a subscriber from the calling party is received. The text feed received may change between calls received by the subscriber from the calling party.

In accordance with another embodiment of the invention, a method of providing a dynamic ringback tone to a calling party is provided. The method includes receiving a text feed. The text is converted to speech to form a ringback tone. A call to a subscriber from the calling party is received. The ringback tone is provided to the calling party. The text feed received may change between calls received by the subscriber from the calling party.

In accordance with another embodiment of the invention, a method of providing a dynamic ringback tone to a calling party is provided. The method includes receiving an audio feed. The audio feed is stored in memory so as to create a ringback tone. A call to a subscriber from the calling party is received. The ringback tone is provided to the calling party. The audio feed received may change between calls received by the subscriber from the calling party.

BRIEF DESCRIPTION OF THE DRAWINGS

The foregoing features of the invention will be more readily understood by reference to the following detailed description, taken with reference to the accompanying drawings, in which:

FIG. 2 shows various types of data that may be considered in providing an adaptive ringback tone to a calling party, in accordance with one embodiment of the invention;

DETAILED DESCRIPTION OF SPECIFIC EMBODIMENTS

In illustrative embodiments of the invention, a system and method of providing ringback tones is presented. Adaptive ringback tones are presented that allow a calling party to hear a different ringback tone each time a call is made to the subscriber. Furthermore, actionable ringback tones are also presented that allow a calling party to invoke various actions using speech and/or DTMF input while listening to the ringback tone. Still other ringback tones are presented, such as progressive and dynamic ringback tones.

Figure 1A:
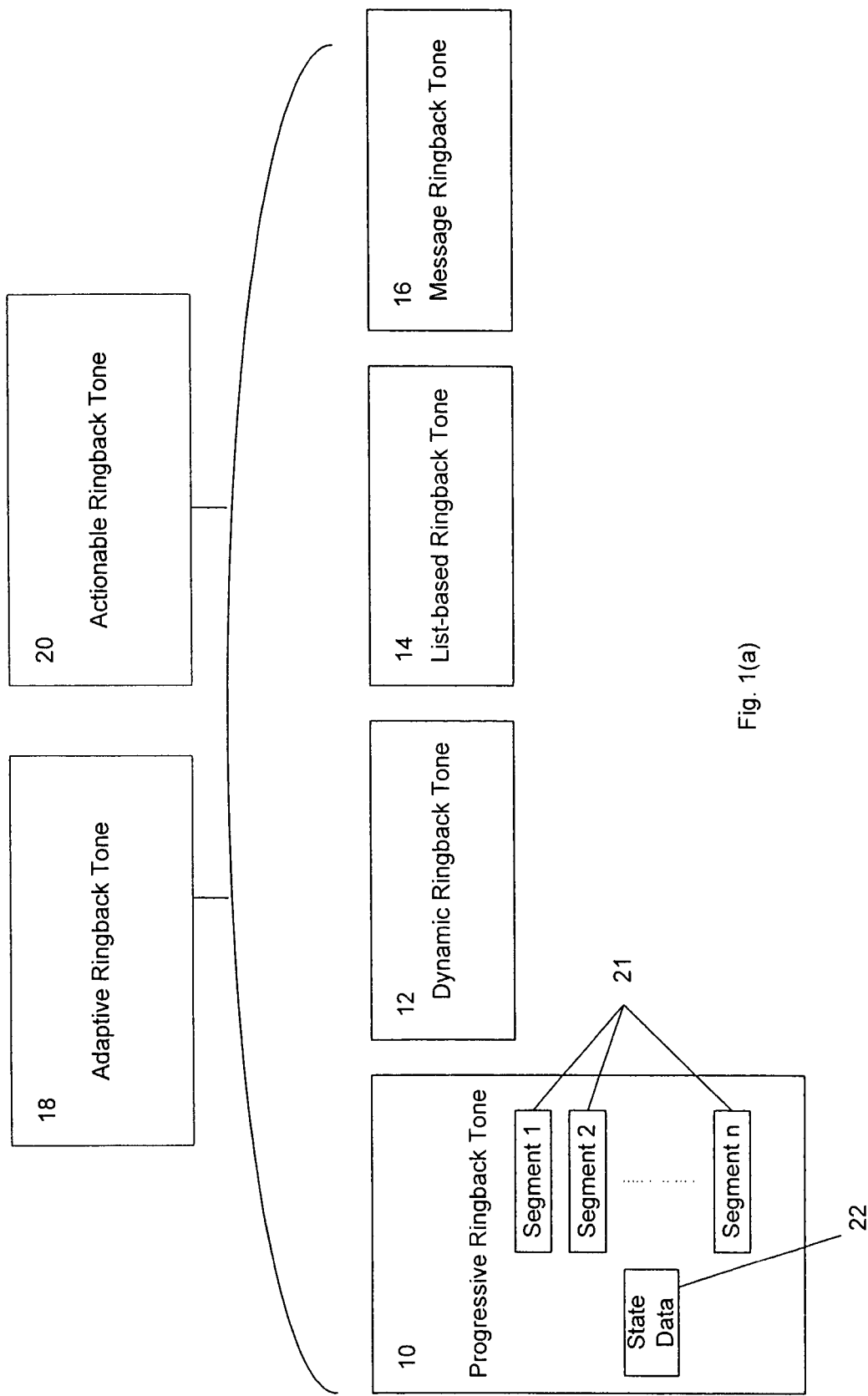
FIG. 1(a) is a block diagram illustrating exemplary types of ringback tones, in accordance with one embodiment of the invention.

FIG. 1(a) is a block diagram illustrating exemplary types of ringback tones that may be provided to a calling party. The ringback tones provided may include, without limitation, audio (e.g., music, jokes, information of any kind, and/or an audio clip recorded by a subscriber), video (e.g., movies, pictures, and/or videos), and/or text. It is to be understood that the ringback tones shown in FIG. 1(a) are not exhaustive, and that other types of ringback tones may be provided.

As shown in FIG. 1(a), a ringback tone may be a list-based ringback tone in which a list of ringback tones is stored by a service provider. Upon receiving a call from a calling party, the service provider randomly selects and plays one ringback tone from the list of ringback tones. As the ringback tones are selected randomly, its possible that a calling party hears certain ringback tones more frequently than others, and other ringback tones less frequently, and possibly not at all.

Another ringback tone that may be provided to a calling party is a message ringback tone, in which the subscriber records his own ringback tone. Upon receiving a call from one or more calling parties, the message ringback tone is played. The message ringback tone may advantageously be used by a subscriber when the subscriber is unavailable to answer the phone, but nevertheless wants to leave a message for one or more calling parties. However, since no record that the calling party has heard the message is maintained, the message will be repeated the next time the calling party calls.

Another ringback tone that may be provided to a calling party is a dynamic ringback tone, in accordance with one embodiment of the invention. A dynamic ringback tone is one that changes, for example, over time. More particularly, the dynamic ringback tone is associated with an audio file that includes data that is dynamic between one or more calls from the subscriber. Examples of a dynamic ringback tone include current sport scores, stock prices, news, podcasts, blogs and other dynamic content. In updating the dynamic ringback tone, the service provider may receive current information from one or more network databases and/or services.

In various embodiments of the invention, a ringback tone may be a progressive ringback tone 10. Progressive ringback tones 10, described in more detail below with regard to FIG. 5, include a plurality of segments 21, with each segment 21 providing audio content that, without limitation, replaces a phone ring. For example, a story narrated in short sentences could be played with each sentence replacing a ring. When the call is answered, the story stops. Another example might be to offer dynamic sports scores in place of each phone ring. State data 22 is stored by a service provider that may include, without limitation, which segments have been already played, or the last segment played, which can then be used to select the next segment to be played within a call, and between calls using adaptive ringback tone profiles (as shown in FIG. 1(a) and FIG. 1(b)).

In illustrative embodiments of the invention, each of the above-described ringback tones may further be made adaptive 18 and/or actionable 20. Further details are described below.

Figure 1B:
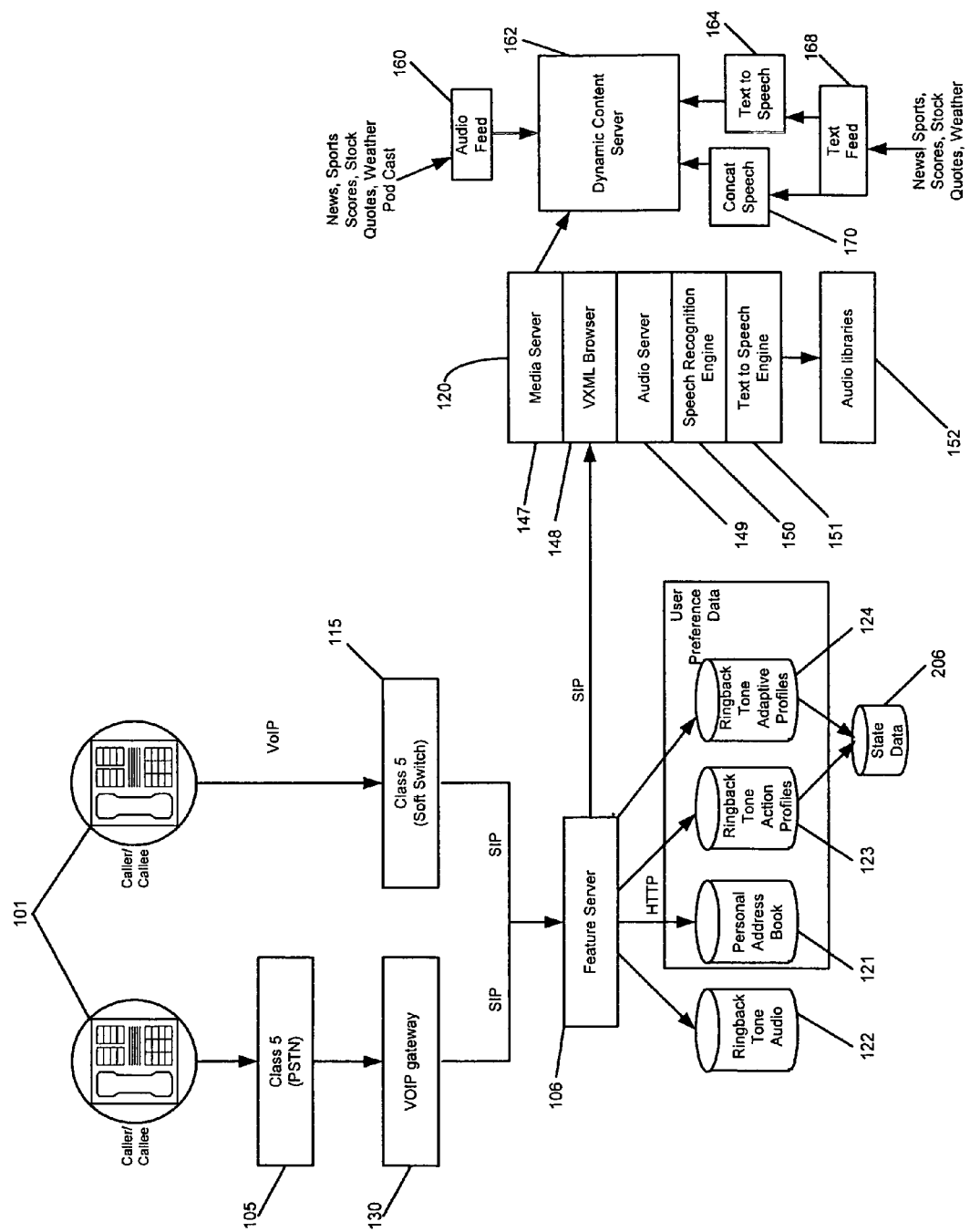
FIG. 1(b) is a block diagram of a system architecture for providing ringback tones, in accordance with one embodiment of the invention.

FIG. 1(b) is a block diagram of a system architecture for providing ringback tones, in accordance with one embodiment of the invention. The ringback tones provided may be, without limitation, any combination of progressive, list-based, dynamic, message, adaptive, and/or actionable ringback tones.

In the architecture of FIG. 1, a subscriber 101 of a service provider may place or receive calls through a Public Switched Telephone Network (PSTN) or through Voice Over Internet Protocol (VOIP). If a subscriber 101 initiates or receives a call via the PSTN, the call passes through a class 5 switch 105. If the subscriber initiates or receives a call via VOIP, the call passes through a softswitch 115 that mimics a class 5 PSTN switch.

A Monitoring Agent (MA) resides at both the softswitch 115 and at the PSTN class 5 switch 105. The MA monitors subscriber activities at the softswitch 105 or 115 and interfaces with a feature server 106 of the service provider when triggered or otherwise appropriate. If the call is being processed through the PSTN, the MA interfaces with the feature server 106 via a VOIP gateway 130. If the call is VOIP, a soft switch 115, which mimics a class 5 switch, connects the call to the feature server 106. Protocol used between the feature server 106 and the VOIP gateway 104 or class 5 switch 105 may be, without limitation, SIP (Session Initiation Protocol).

The feature server 106 performs intelligent call control that provides adaptive and/or caller actionable ringback tone functionality. Upon receiving information from the MA, the feature server 106 determines which calls receive adaptive and/or caller actionable ringback tone functionality, and provides this functionality accordingly. For example, the services and functionality provided to the subscriber may be based on which services he subscribes to.

The feature server 106 may access various databases and/or services to assist with this functionality, such as, without limitation, a speech enabled media server 120, a personal address book 121, a ringback tone audio database 122, a ringback tone action profiles database 123, and/or a ringback tone adaptive profiles database 124. Other databases may also be accessed, depending on, for example, the type of ringback tone. These databases and/or services may reside together or may be distributed across multiple network elements. Specifically, each database and/or service may be located at, without limitation, a phone handset, an instant messaging client, a service provider switch fabric, a service provider network, and/or a third party network. The communication protocol between the feature server 106 and these other servers and/or databases may be, for example, HTTP (Hypertext Transfer Protocol).

To play the ringback tone and to interact with the calling party, the feature server may initiate a session with the speech enabled media server (SEM) 120 using, for example, SIP. The SEM server 120 obtains the IP address of either the VOIP gateway or the VOIP telephone from the feature server 106 during the SIP communications. The SEM server 120 transfers the ringback tones and/or voice prompts to the VOIP gateway or directly to the VOIP phone using RTP (the real-time protocol). The SEM server 120 may include, but is not limited to, a media server 147, a VXML browser 148, an audio server 149, a speech recognition engine 150, and a text to speech engine 151, which may further include several audio libraries 152.

Providing a dynamic ringback tone may include receiving, without limitation, an audio, video or text feed. The feed may include, for example, news, sports, scores, stock market quotes, weather, or a podcast. The audio feed 160 may be stored in memory to form the dynamic ringback tone. Forming the dynamic ringback tone based on a text feed 168 may include concatenating speech segments 170 based on the text feed 168 and/or converting the text feed 168 to speech 164.

In illustrative embodiments of the invention, an adaptive ringback tone provides the capability to adapt and play a different ringback tone and/or varying portions of a ringback tone each time a call is received from a calling party. The adaptive ringback tone may be provided to the calling party over a plurality of calls with substantially no subscriber interaction, other than defining initial user preferences.

The adaptive ringback tone may be of various types. For example, an adaptive ringback tone may be based on the above-described progressive ringback tone in which progressive segments of a ringback tone are provided. Exemplary adaptive progressive ringback tones include playing back progressive segments of a song, story, joke, or a top 10 list each time a call is received from a calling party. This allows the calling party to eventually hear the entire song, story, joke, or list, over the course of a plurality of calls, as opposed to repeatedly hearing only the same thing.

Another type of adaptive ringback tone is based on the above-described message ringback tone in which the subscriber records his own ringback tone. Upon the message ringback tone being played to the calling party over one or a plurality of calls, the system advantageously adapts and reverts to a default ringback tone, such that the calling party does not hear the same message over and over again.

Still another type of adaptive ringback tone is based on the above-described dynamic ringback tone that changes, without limitation, over time. Those portions of the dynamic ringback tone already heard by the calling party are not repeated. For example, a calling party may be associated with an adaptive dynamic ringback tone that includes scores related to football and hockey. If the calling party already heard the latest scores related to football, on the next call the ringback tones will include hockey scores and the football scores will not be repeated.

An adaptive ringback tone may also be based on a list-based ringback tone. In preferred embodiments, the ringback tone provided has yet to be heard by the calling party, or has not been provided to the calling party for a certain amount of time. The adaptive list-based ringback tone may include ringback tones associated with one or more categories, described in more detail below.

FIG. 2 shows various types of data that may be considered in providing the adaptive ringback tone to the calling party, in accordance with one embodiment of the invention. These types of data include, without limitation, ringback tone type data 202, user preference data 204, and state data 206.

The ringback tone type data 202 indicates an adaptive ringback tone's type. Various types of adaptive ringback tones are described above. Handling of the adaptive ringback tone may vary based on the type of adaptive ringback tone.

The user preference data 204 provides an initial association between a calling party and one or more adaptive ringback tones. For example, the subscriber may know that a calling party is fond of sports. With this knowledge, the subscriber can provide user preference data 204 associating the calling party with a dynamic ringback tone that plays the current sport scores. The user preference data 171 may associate the calling party with various types of adaptive ringback tones, such as, without limitation, a progressive ringback tone, a message ringback tone, a dynamic ringback tone or a list-based ringback tone. The user preference data 171 may be provided by, without limitation, the subscriber, service provider or calling party.

State data 204 associated with adaptive ringback tones includes at least one condition of the ringback tone(s) associated with the calling party that changes between one or more calls between the calling party and the subscriber. For example, the state data may include the last segment and/or playback position played in a progressive ringback tone, described in more detail below. In various embodiments, the state data may include a caller history of the ringback tone(s) heard by the calling party. The caller history may be used to select a ringback tone that has yet to be heard by the calling party. State data 204 is to be differentiated from user preference data 204, which is used to initially associate the ringback tone(s) 202 with a calling party.

Figure 3:
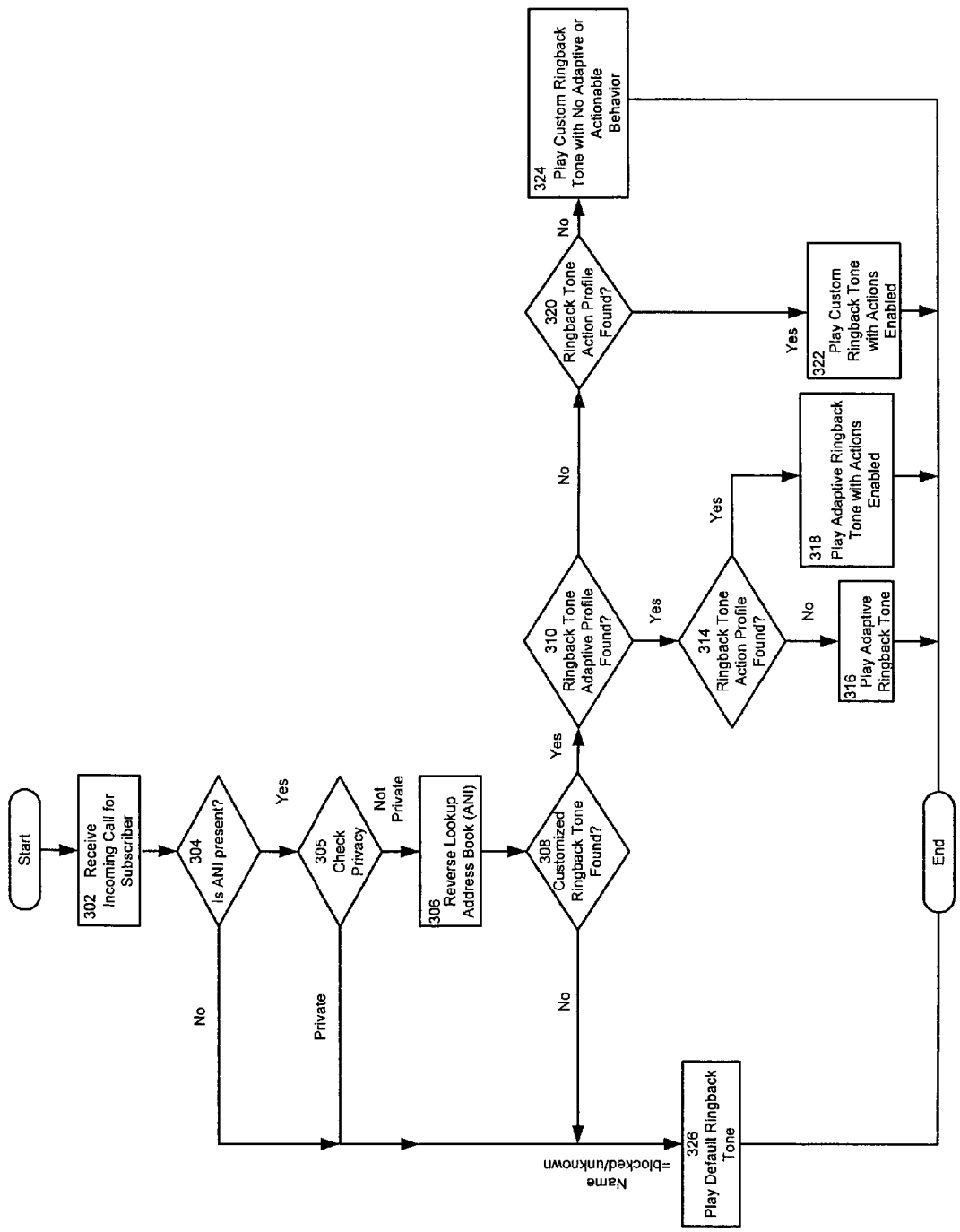
FIG. 3 is a flowchart showing a method of providing an adaptive ringback tone and/or an actionable ringback tone to a calling party, in accordance with one embodiment of the invention.

FIG. 3 is a flowchart showing a method of providing an adaptive ringback tone and/or an actionable ringback tone (described in more detail below) to a calling party, in accordance with one embodiment of the invention. The method begins at step 302, in which a call from a calling party for a subscriber is received at the feature server 106. Initially, the feature server 106 may assume the subscriber has subscribed to adaptive and/or actionable ringback tone functionality. In other embodiments, the feature server 106 may check to see if the subscriber has subscribed to invoke adaptive and/or actionable ringback tone functionality before proceeding, or each subscriber may automatically receive adaptive and/or actionable ringback tone functionality.

Upon receiving the call, the presence of associated calling party information is determined in step 304. For example, Automatic Number Identification (ANI) includes the calling party's phone number, and is typically sent by a telephone company along with a request for connection, which rings the subscriber's phone.

If it is determined that ANI is not present, a default ringback tone is provided to the calling party, step 326. The default ringback tone may be any of the aforementioned types of ringback tones, and/or may be, for example, a ringback tone selected by the calling party. In various embodiments, the default ringback tone may be randomly selected from a list of ringback tones.

If ANI is present, a privacy check may be performed in step 305 to determine whether there is a privacy requirement to not present to the called party. In various embodiments, the default ringback tone may be provided to the calling party, step 326, if there is a privacy requirement.

If ANI is present and provides the calling party's phone number, and if no privacy requirement exists, a reverse lookup in the subscriber's personal address book 121 or other database is performed, step 306. The personal address book 121 may be used to store, without limitation, the subscriber's contacts and associated information, including without limitation, the names, phone numbers, addresses, email addresses, instant messaging identifications, and/or associated group names, such as friend, family, or soccer buddy.

Upon finding the calling party's contact information in, for example, the personal address book 121 of the subscriber, a determination as to whether the calling party is configured for a customized ringback tone is performed, in step 308. The customized ringback tone 308 may be, without limitation, a progressive ringback tone, a message ringback tone, a list-based ringback tone, or a message ringback tone. In various embodiments, the personal address book 121 or other database may include an entry that indicates whether the calling party is configured for a customized ringback tone. For example, in various embodiments, user preference data 204 (see FIG. 2) indicating what ringback tone(s) is to be played for a particular calling party may be stored, without limitation, in the personal address book 121. The entry may include, without limitation, an address that points to a customized ringback tone in the ringback tone audio database 122.

If the calling party is not configured for a customized ringback tone, a default ringback tone is provided, step 326. If the calling party is configured for a customized ringback tone, a determination is made as to whether the calling party has an associated adaptive profile in step 310. This determination may be made, without limitation, by checking an entry in the personal address book 121 indicative of whether the calling party has an associated adaptive profile.

The adaptive profile may be stored, for example, in the ringback tone adaptive profiles database 124. The adaptive profile may include or point to, without limitation, state data 206 and/or ringback tone type data 171 which can then be advantageously used to drive the adaptive behavior of the ringback tones associated with the calling party.

If the calling party does not have an associated adaptive profile, the custom ringback tone may be provided to the calling party without adaptive functionality and with or without actions enabled (described in more detail below) in step 322 and 324, respectively. If an associated adaptive profile is found, the adaptive ringback tone is provided to the calling party with or without actions enabled in step 318 in 316, respectively. Other embodiments may provide only adaptive ringback tone functionality, or only actionable ringback tone functionality.

Figure 4:
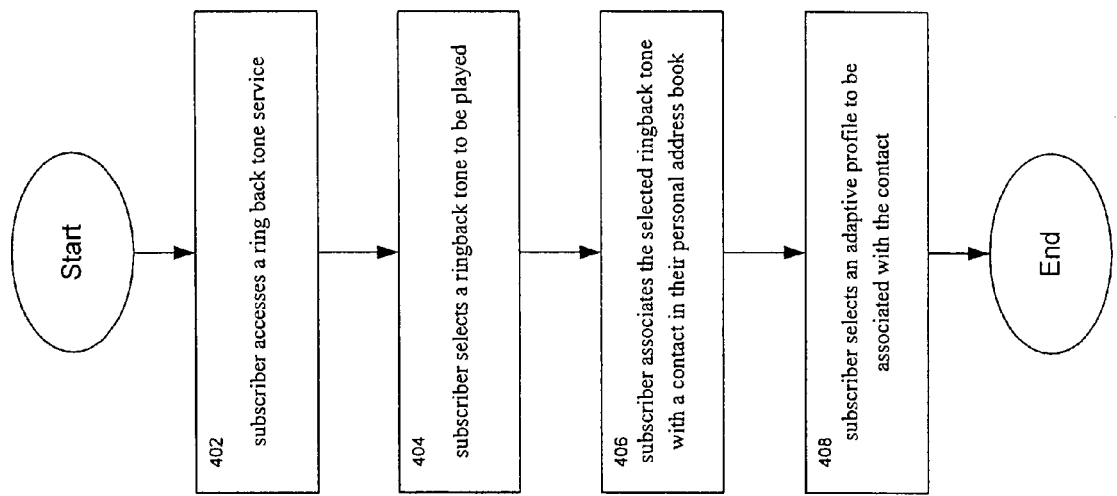
FIG. 4 is a flowchart showing a method of setting up a adaptive profile, in accordance with one embodiment of the invention.

FIG. 4 is a flowchart showing a method of configuring an adaptive profile, in accordance with one embodiment of the invention. It is to be understood that the order of the steps in FIG. 4 may vary. In step 402, a subscriber accesses a ringback tone service via, without limitation, a network such as the Internet, or by phone.

The subscriber selects a ringback tone to be played in step 404. If the subscriber is selecting a list-based ringback tone, a plurality of ringback tones may be selected. The audio of the selected ringback tone(s) may be stored, without limitation, in the ringback tone audio database 122.

Upon selecting the ringback tone(s), the subscriber associates the selected ringback tone(s) with, for example, a contact, group(s) of contacts, or all contacts in their personal address book 121 in step 406. This association may be stored, for example, as user preference data 204.

The subscriber then selects that an adaptive profile is to be associated with the contact in step 408, causing an adaptive ringback tone profile to be stored for that particular contact in the ringback tone adaptive profiles database 124. Alternatively, upon the subscriber selecting a ringback tone(s), an adaptive profile may be automatically associated with the contact without subscriber interaction, such that step 408 can be skipped.

Figure 5:
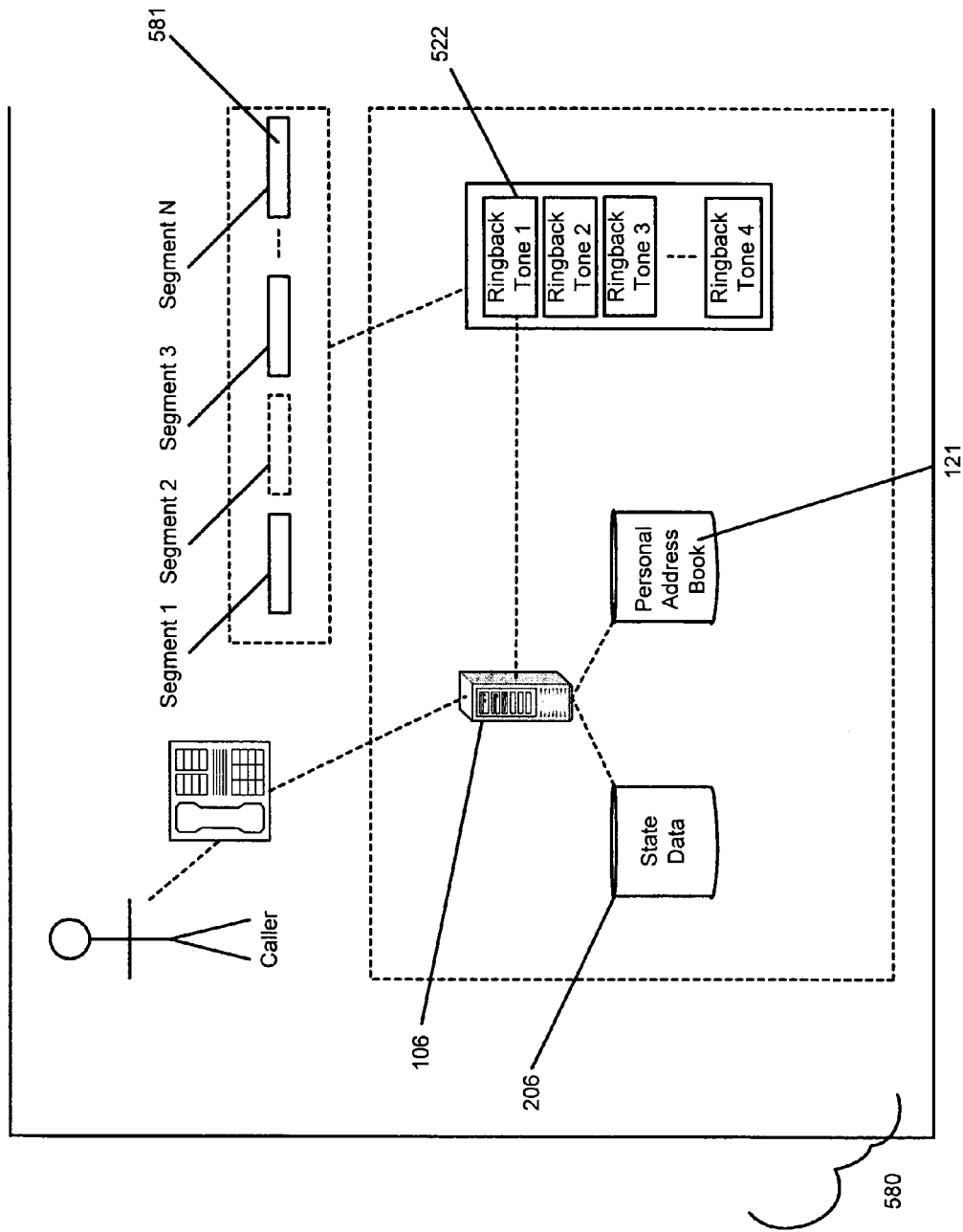
FIG. 5 is a block diagram showing a progressive ringback tone system that includes ringback tones that are segmented, in accordance with one embodiment of the invention.

FIG. 5 is a block diagram showing a progressive ringback tone system 580 that includes ringback tones 522 that are segmented, in accordance with one embodiment of the invention. Each segment 581 in the ringback tone 522 may have the same duration, such as four seconds. Alternatively, the segments in a ringback tone 522 may have varying duration. A period of silence may separate each segment 581. For example, two seconds of silence may separate each segment 581 in a ringback tone 522. Instead of a period of silence, a sound separator may separate each segment 581, such as a particular sound effect. Alternatively, the ringback tone segments may be played in a continuous manner with no interrupting sound separators or periods of silence.

The state data associated with an adaptive, progressive ringback tone, such as shown in FIG. 5, may provide a playback position. The playback position is indicative of when the calling party stopped listening to the progressive ringback tone in a previous call. For example, with regard to a segmented progressive ringback tone, the playback position may provide which ringback tone segment 581 was last being heard by the calling party. Furthermore, the playback position may include a position within the last ringback tone segment being played. Upon receiving the next call from the calling party, the playback position may be used, for example, in determining where to start playing the progressive ringback tone. The playback position associated with the ringback tone may be stored, without limitation, as a function of time, as a byte location within the progressive custom ringback tone and/or as an index to which segment played last.

Figure 6:
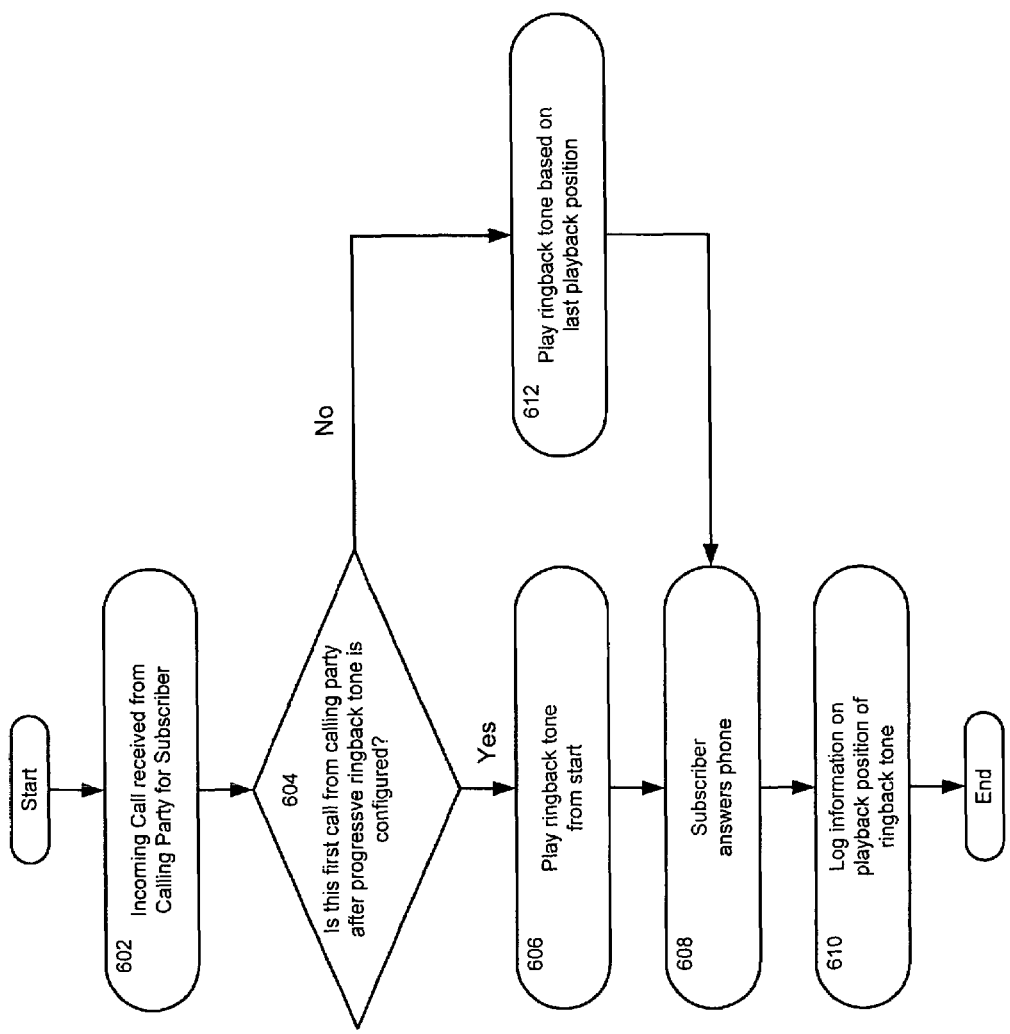
FIG. 6 is a flowchart showing a method of providing a progressive ringback tone involving playback positions, in accordance with one embodiment of the invention.

FIG. 6 is a flowchart showing a method of providing an adaptive progressive ringback tone involving playback positions, in accordance with one embodiment of the invention. The method begins at step 602 in which an incoming call is received from a calling party. Assuming that the calling party is identified with a customized ringback tone associated with an adaptive profile, as described in connection with FIG. 2, a determination is made as to whether this is the first call received after the adaptive ringback tone was configured by the subscriber (described in more detail below) in step 604. State data that includes a call history of the calling party may be checked.

If the call is the first call received after the adaptive ringback tone was configured, the customized ringback tone is played from the start of the ringback tone in step 606. In typical embodiments, the start of the customized ringback tone is identified at a particular address in the ringback tone audio database 122. Upon the subscriber answering the phone step 608, or upon the calling party hanging up, playing of the customized ringback tone is stopped and the current position in playback of the customized ringback tone is stored in memory step 610. This playback position may be stored as state data in, without limitation, the ringback tone adaptive profile database 124. Note that instead of stopping the playing of a segmented ringback tone immediately upon the subscriber answering the phone, the segment currently being listened to may be played, in its entirety, before disconnecting the call.

If the call is not the first call received after the adaptive ringback tone was configured (e.g., a second or third call), the ringback tone is played starting from a position based on the playback position in step 612, as opposed to the start of the adaptive ringback tone in step 606. For example, if the ringback tone is segmented, segment N last being played to the calling party may be repeated in it's entirety, or playback may start with the next segment N+1 depending on how much of segment N was already heard by the calling party.

With regard to a adaptive, list-based ringback tone, the adaptive profile may include a list or category of ringback tones. Furthermore, the state data associated with the adaptive profile may provide, without limitation, which ringback tone to play next and/or a caller history that indicates which ringback tones have already been heard by the calling party. As described above, a different ringback tone from the list of ringback tones may be provided each time a call is received from a calling party. The next ringback tone played may be provided in a random or pre-defined sequence. The list of ringback tones may include, without limitation: random selections; one or more categories such as sports, jazz, or funny sounds; one or more categories based on a particular movie theme, music themes and/or the type of caller, such as family, close friends, an/or distant relatives. In this manner, instead of hearing the same ringback tone each time a call is made to the subscriber, the calling party automatically hears a different ringback tone.

With regard to an adaptive message ringback tone, the state data may indicate, without limitation, if the calling party has heard the message. If the calling party has heard the message, a default ringback tone is provided the next time a call is received from the calling party, such that the calling party does not hear the message over and over again. The default ringback tone may be, for example, another adaptive ringback tone selected by the subscriber. For example, the subscriber may provide user preference data associating a dynamic ringback tone with a contact. Subsequently, the subscriber may provide user preference data associated with the contact that points to a message ringback tone, which when heard by the subscriber, reverts back to the previously selected dynamic ringback tone.

Referring back to FIG. 3, an actionable ringback tone may be provided to a calling party (with or without adaptive functionality), in accordance with one embodiment of the invention. As opposed to conventional ringback tones, an actionable ringback tone allows a calling party to act on a ringback tone. An actionable ringback tone may include a dynamic program that allows interaction with a listener via voice and/or one or more DTMF keys. For example, while listening to a ringback tone, a calling party could press a key to purchase the ringback tone for use in their own phone. Actionable ringback tones may also enable, without limitation, a calling party to respond to a message played in a ringback tone before the call is even connected. With actionable ringback tones, messages could be set up to allow responses. For example, a phone survey may be conducted using actionable ringback tones before a call is connected or a simple question may be conveyed and answered, such as "are you coming to dinner tonight."

If the calling party is configured for a customized ringback tone in step 308 of FIG. 3, a determination is made as to whether the customized ringback tone has an associated action application profile in step 314 (with adaptive functionality) or step 320 (without adaptive functionality). Note that in various embodiments, only actionable ringback tones without adaptive functionality are provided. The personal address book may include an entry that indicates whether the customized ringback tone has an associated action application profile. The entry may include an address that points to the action application profile in the ringback tone action profiles database 123.

If the customized ringback tone does not have an associated action application profile, the adaptive or custom ringback tone is provided to the calling party without actionable functionality in steps 316 and 324, respectively. If an associated application profile is found, the adaptive or customized ringback tone is provided to the calling party along with launching of an actionable application in steps 318 and 322, respectively.

Figure 7:
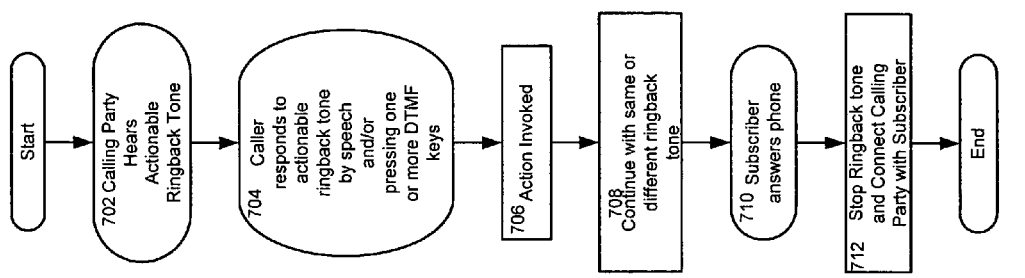
FIG. 7 is a flowchart showing a method of interacting with an actionable ringback tone, in accordance with one embodiment of the invention.

FIG. 7 is a flowchart showing an exemplary method of interacting with an actionable ringback tone, in accordance with one embodiment of the invention. Upon calling a subscriber, a calling party hears an actionable ringback tone in step 702. The actionable ringback tone may provide, without limitation, a voice prompt addressing a limitless variety of subjects. For example, the voice prompt may ask the calling party a question, such as "are you coming to dinner tonight," or request the calling party's opinion with regard to a certain subject matter, such as an election, a TV show, a song, or an advertisement.

The calling party may then act upon the actionable ringback tone by, without limitation, speaking and/or pressing one or more DTMF keys in step 704. For example, the calling party may say "I love it" or press DTMF key 1 in response to a ringback tone asking the calling party's opinion with regard to a particular song.

The calling party's response to the actionable ringback tone invokes an action at, without limitation, the service provider in step 706. A wide variety of actions may be invoked including, without limitation, a commercial transaction or the logging of the response. For example, upon the calling party saying "I love it" in response to a ringback tone asking for an opinion, the calling party's response may be logged as an approval. In another example, the calling party could press a DTMF key or say a command like "Buy It" to purchase the ringback tone. In various embodiments, the action invoked may not only be based on the calling party's present response to the actionable ringback tone, but also on state data 206 associated with the calling party that may include, without limitation, the calling party's response to the actionable ringback tone in a previous call.

Upon receiving the calling party's response to the actionable ringback tone and/or processing the action invoked by the calling party's response, the ringback tone may be continued in step 708. In various embodiments, further actions may be invoked by the calling party. Alternatively, a different and perhaps non-actionable ringback tone may be provided to the calling party. Once the subscriber answers the phone in step 810, the actionable ringback tone is terminated and the calling party and subscriber are connected in step 812.

Figure 8A:
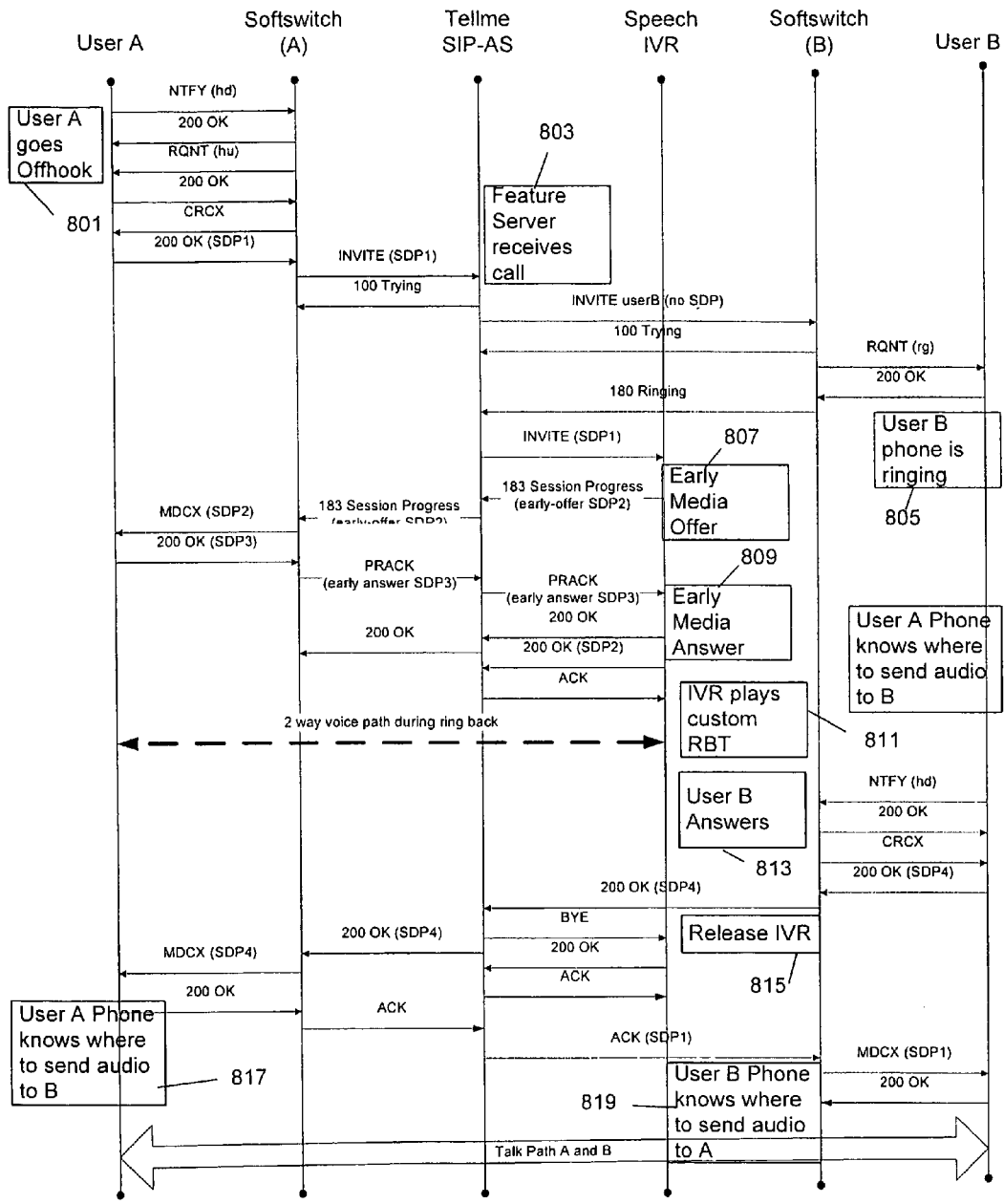
FIG. 8(a) shows flow control of an actionable ringback tone in a generic carrier network using early media, in accordance with one embodiment of the invention.
Figure 8B:
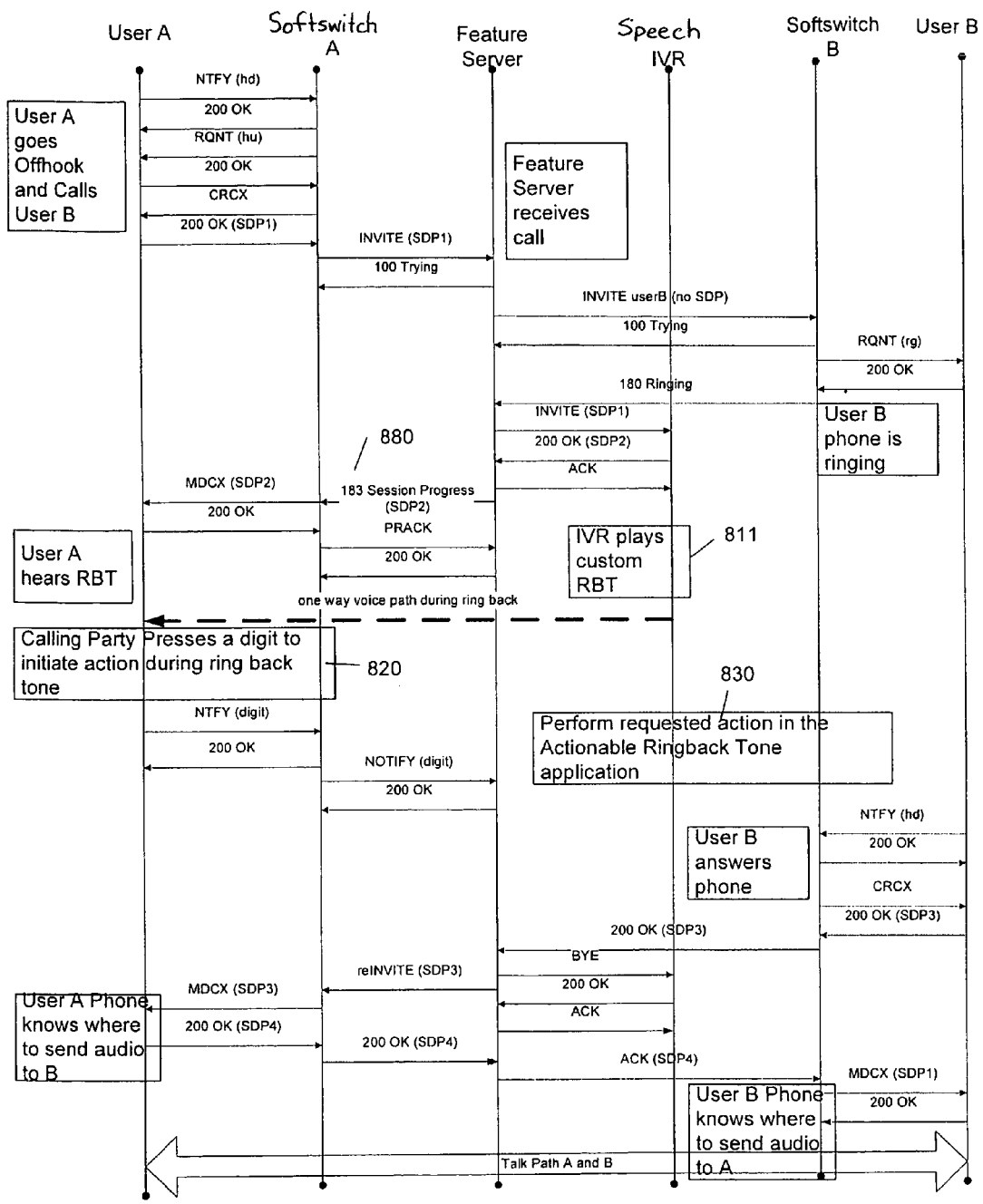
FIG. 8(b) shows flow control of an actionable ringback tone in a generic carrier network using a signaling channel, in accordance with one embodiment of the invention.

FIG. 8(*a*) shows flow control of an actionable ringback tone in a generic carrier network using early media protocol known in the art, in accordance with one embodiment of the invention. Using early media, a two way voice path is established that enables a voice and/or DTMF interface between the calling party (User A) and the subscriber (User B) prior to User B answering the call. No specific PSTN protocol (SS7 or ISDN) is shown. User B has ringback tone service and has configured an actionable ringback tone for User A.

User A places a call to User B at block 801. The feature server 106 receives the call at block 803, and triggers the ringback tone service as a terminating service for User B. The feature server 806 consults the personal address book 121 to select the actionable ringback tone to be played for caller User A. Upon receiving the call from User A, the feature server 801 causes User B's phone to ring in block 805. The feature server then interfaces with the speech enabled media server (SEM) 120 to provide an early media offer to User A in block 907. Upon receiving an early media answer in block 809, a two way voice interface is enabled, and the SEM plays the actionable ringback tone to User A in block 811. User A may then respond to the actionable ringback tone using speech and/or DTMF key(s). The feature server 106 in combination with speech enabled media server (SEM) 120 processes the speech and logs the caller response and/or performs other desired actions.

Upon User B answering the call in block 813, the feature server 106 will disable the actionable ringback tone and 2 way voice path in block 815, and interact with the switching fabric to establish a voice path between the User A and User B, blocks 817 and 819.

FIG. 8(*b*) shows flow control of an actionable ringback tone in a generic carrier network using a signaling channel, in accordance with one embodiment of the invention.

Instead of an early offer request, a 880 session progress is sent to the User A that initiates DTMF functionality. While the actionable ringback tone is playing in block 811, User A may then press one or more DTMF keys during the actionable ringback tone in block 820. The feature server will then initiate the requested actionable ringback tone application in block 830.

In various embodiments, the disclosed method may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method of providing an adaptive ringback tone to a calling party, the method comprising:
   receiving a call to a subscriber from the calling party;
   providing an adaptive ringback tone to the calling party based on state data;
   storing a playback position in the state data, die playback position indicative of when the calling party stopped listening to the adaptive ringback tone in a previous call.

2. The method according to claim 1, further including:
   maintaining a database for storing the state data.

3. The method according to claim 1, wherein the call includes ANI information having a phone number of the calling party, the method further comprising performing a reverse lookup in a database using the phone number of the calling party so as to locate the state data of the calling party.

4. The method according to claim 3, further including:
   wherein the database is a personal address book related to the subscriber.

5. The method according to claim 1, wherein the adaptive ringback tone is based on one of a progressive ringback tone, a message ringback tone, a list-based ringback tone, and a dynamic ringback tone.

6. The method according to claim 1, wherein the adaptive ringback tone is divided into a plurality of segments.

7. The method according to claim 6, wherein the playback position includes a segment position indicative of the last segment heard by the calling party.

8. The method according to claim 6, wherein providing the adaptive ringback tone includes:
   playing the adaptive ringback tone as a function of the playback position.

9. A method of providing an adaptive ringback tone to a calling party, the method comprising:
   receiving a call to a subscriber from the calling party;
   providing an adaptive ringback tone to the calling party based on state data;
   wherein providing the adaptive ringback tone includes:
   maintaining a list of ringback tones;
   selecting one of the ringback tones based on the state data;
   wherein the state data includes a history of ringback tones provided to the calling party, and wherein selecting the ringback tone is a function of the history;
   providing the selected ringback tone.

10. The method according to claim 9, wherein the list of ringback tones includes one or more categories of ringback tones.

11. The method according to claim 10, wherein the category is based on at least one of a movie theme, a musical theme, and a sport.

12. A method of providing an adaptive ringback tone to a calling party, the method comprising:
   receiving a call to a subscriber from the calling party;
   providing an adaptive ringback tone to the calling party based on state data;
   wherein the adaptive ringback tone is associated with a file stored in a ringback tone database, and wherein the file includes data that is dynamic between one or more calls from the subscriber.

13. A system for providing an adaptive ringback tone to a calling party, the system comprising:
   a call module for receiving a call to a subscriber from the calling party;
   a ringback tone module for providing an adaptive ringback tone to the calling party based on state data;
   wherein the state data includes a playback position, the playback position indicative of when the calling party stopped listening to the adaptive ringback tone in a previous call, and wherein the ringback tone module provides the adaptive ringback tone starting as a function of the playback position.

14. The system according to claim 13, further including:
   a database for storing the state data.

15. The system according to claim 13, further comprising a reverse lookup module for performing a reverse lookup in a database using caller id information received in the call, so as to locate the state data associated with the calling party.

16. The system according to claim 15, wherein the database is a personal address book.

17. The method according to claim 13, wherein the adaptive ringback tone is based on one of a progressive ringback tone, a message ringback tone, a list-based ringback tone, and a dynamic ringback tone.

18. The system according to claim 13, wherein the adaptive ringback tone is divided into segments.

19. The system according to claim 18, wherein the playback position includes a segment position indicative of the last segment heard by the calling party, and wherein the ringback tone module provides the adaptive ringback tone as a function of the segment position.

20. The system according to claim 13, wherein the ringback tone module includes:
   a list of ringback tones, and
   a ringback tone selection module for selecting, based on the state data, one of the ringback tones in the list to be provided to the calling party.

21. The system according to claim 20, wherein the list of ringback tones includes one or more categories of ringback tones.

22. The system according to claim 21, wherein the category is at least one of a movie theme, a musical theme, and a sport.

23. A system for providing an adaptive ringback tone to a calling party, the system comprising:
- a call module for receiving a call to a subscriber from the calling party;
- a ringback tone module for providing an adaptive ringback tone to the calling party based on state data;
- wherein the ringback tone module includes:
- a list of ringback tones;
- a ringback tone selection module for selecting, based on the state data, one of the ringback tones in the list to be provided to the calling party;
- wherein the state data includes a history of ring back tones provided to the calling party, the selection module selecting the ringback tone as a function of the history.

24. A system for providing an adaptive ringback tone to a calling party, the system comprising:
- a call module for receiving a call to a subscriber from the calling party;
- a ringback tone module for providing an adaptive ringback tone to the calling party based on state data;
- wherein the adaptive ringback tone is associated with a file stored in a ringback tone database, and wherein the file includes data that is dynamic between one or more calls from the subscriber.

25. A method of providing an actionable ringback tone to a calling party, the method comprising:
- receiving a call directed towards a subscriber from the calling party;
- providing an actionable ringback tone to the calling party;
- receiving a response to the actionable ringback tone from the calling party;
- performing an action based on the response;
- wherein the actionable ringback tone includes a voice prompt.

26. The method according to claim 25, further comprising:
- the subscriber answering the call; and
- interrupting the actionable ringback tone provided to the calling party.

27. The method according to claim 25, wherein interrupting the actionable ringback tone includes continuing to play the ringback tone until a predetermined stopping point is reached.

28. The method according to claim 25, wherein the actionable ringback tone includes at least one of a question, an advertisement, a survey request, a transaction, and an inquiry as to whether the calling party wishes to purchase the ringback tone.

29. The method according to claim 25, wherein performing the action includes logging the response in a database.

30. The method according to claim 25, further comprising the calling party providing the response by at least one of providing a voice response and pressing one or more DTMF keys.

31. The method according to claim 30, wherein providing the actionable ringback tone includes inquiring as to whether the calling party wishes to purchase the ringback tone.

32. A system for providing an actionable ringback tone to a calling party, the system comprising:
- a call module for receiving a call directed towards a subscriber from the calling party;
- a ringback tone module for providing the actionable ringback tone to the calling party;
- a response module for receiving a response to the actionable ringback tone from the calling party;
- an action module for performing an action based on the response; wherein the ringback tone module interrupts the actionable ringback tone provided to the calling party upon the subscriber answering the call;
- wherein the ringback tone module interrupts the actionable ringback tone by continuing to play the ringback tone until a predetermined stopping point is reached.

33. A system for providing an actionable ringback tone to a calling party, the system comprising:
- a call module for receiving a call directed towards a subscriber from the calling party;
- a ringback tone module for providing the actionable ringback tone to the calling party;
- a response module for receiving a response to the actionable ringback tone from the calling party;
- wherein the actionable ringback tone includes a voice prompt.

34. The system according to claim 33, wherein the action module includes a database for logging the response.

35. The system according to claim 33, wherein the response module includes a speech enabled media module for receiving a voice response from the calling party.

36. The system according to claim 33, wherein the response module monitors pressing of one or more DTMF keys.

37. A system for providing an actionable ringback tone to a calling party, the system comprising:
- a call module for receiving a call directed towards a subscriber from the calling party;
- a ringback tone module for providing the actionable ringback tone to the calling party;
- a response module for receiving a response to the actionable ringback tone from the calling party;
- wherein the actionable ringback tone includes at least one of a question, an advertisement, a survey request, a transaction, and an inquiry as to whether the calling party wishes to purchase the ringback tone.

38. A method of providing a progressive ringback tone to a calling party, the method comprising:
- defining a plurality of data segments;
- receiving a call to a subscriber from the calling party;
- selecting one of the plurality of segments based on state data associated with the call; and
- providing the selected segment to the calling party.

39. The method according to claim 38, wherein each segment includes at least one of audio data, video data, and text data.

40. The method according to claim 38, wherein the state data includes a playback position indicative of the last segment heard by the calling party.

41. The method according to claim 38, wherein the state data includes a history of the segments already heard by the calling party in the call.

42. The method according to claim 38, further comprising:
- repeatedly selecting and providing until the subscriber answers the call.

43. The method according to claim 42, wherein each segment providing to the calling party is separated by a sound separator.

44. The method according to claim 43, wherein the sound separator is a period of silence.

45. A system for providing a progressive ringback tone to a calling party, the system comprising:
- a plurality of data segments representing a ringback tone;
- a call receive module for receiving a call to a subscriber from the calling party;
- a segment selector for selecting one of the segments based on state data associated with the call; and a call provide module for providing the selected segment to the calling party.

46. The system according to claim 45, wherein each segment includes at least one of audio data, video data, and text data.

47. The system according to claim 45, wherein the state data includes a playback position indicative of the last segment heard by the calling party.

48. The system according to claim 45, wherein the state data includes a history of the segments already heard by the calling party in the call.

49. The system according to claim 45, wherein the call receive module and the segment selector repeatedly select and provide one of the segments until the subscriber answers the call.

50. The system according to claim 49, wherein each segment provided to the calling party is separated by a sound separator.

51. The system according to claim 50, wherein the sound separator is a period of silence.

52. A method of providing a dynamic ringback tone to a calling party; the method comprising:
receiving a text feed;
concatenating speech segments based on the text feed to form a ringback tone;
receiving a call to a subscriber from the calling party;
providing the ringback tone to the calling party.

53. The method according to claim 52, wherein the text feed received changes between calls received by the subscriber from the calling party.

54. A method of providing a dynamic ringback tone to a calling party; the method comprising:
receiving a text feed;
converting the text to speech to form a ringback tone;
receiving a call to a subscriber from the calling party; and
providing the ringback tone to the calling party.

55. The method according to claim 54, wherein the text feed received changes between calls received by the subscriber from the calling party.

* * * * *

UNITED STATES PATENT AND TRADEMARK OFFICE
CERTIFICATE OF CORRECTION

PATENT NO. : 7,613,287 B1 Page 1 of 1
APPLICATION NO. : 11/274945
DATED : November 3, 2009
INVENTOR(S) : Stifelman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Nineteenth Day of October, 2010

David J. Kappos
*Director of the United States Patent and Trademark Office*